(12) United States Patent
Paczkowski

(10) Patent No.: US 12,256,017 B2
(45) Date of Patent: Mar. 18, 2025

(54) TECHNIQUES FOR CORRECTING ANOMALOUS ACTIVITY CAUSED BY SMART CONTRACTS

(71) Applicant: T-Mobile USA, Inc., Bellevue, WA (US)

(72) Inventor: Lyle Walter Paczkowski, Mission Hills, KS (US)

(73) Assignee: T-Mobile USA, Inc., Bellevue, WA (US)

( * ) Notice: Subject to any disclaimer, the term of this patent is extended or adjusted under 35 U.S.C. 154(b) by 189 days.

(21) Appl. No.: 17/990,289

(22) Filed: Nov. 18, 2022

(65) Prior Publication Data

US 2024/0171404 A1 May 23, 2024

(51) Int. Cl.
*H04L 9/32* (2006.01)
*H04L 9/00* (2022.01)

(52) U.S. Cl.
CPC .............. *H04L 9/3247* (2013.01); *H04L 9/50* (2022.05); *H04L 2209/80* (2013.01)

(58) Field of Classification Search
CPC ...... H04L 9/3247; H04L 9/50; H04L 2209/80
USPC ........................................................ 713/168
See application file for complete search history.

(56) References Cited

U.S. PATENT DOCUMENTS

| | | | |
|---|---|---|---|
| 10,594,477 B2 * | 3/2020 | Shao | H04L 9/3297 |
| 10,616,324 B1 * | 4/2020 | Kaddoura | H04L 69/329 |
| 10,812,255 B2 | 10/2020 | Li | |
| 11,018,851 B2 | 5/2021 | Sarin | |
| 11,057,221 B2 | 7/2021 | Peng | |
| 11,068,887 B2 | 7/2021 | Xia et al. | |
| 11,113,271 B2 | 9/2021 | Zhuo et al. | |
| 11,139,979 B2 | 10/2021 | Van De Ruit et al. | |
| 11,171,782 B2 | 11/2021 | Tang et al. | |
| 11,176,257 B2 | 11/2021 | Braghin et al. | |
| 11,315,120 B2 | 4/2022 | Levacher et al. | |
| 11,354,656 B2 | 6/2022 | Xia et al. | |
| 11,356,270 B2 | 6/2022 | Fang | |

(Continued)

FOREIGN PATENT DOCUMENTS

| CA | 111831740 A | 10/2020 |
|---|---|---|
| CN | 111028077 A | 4/2020 |

(Continued)

*Primary Examiner* — Thanh T Le
(74) *Attorney, Agent, or Firm* — Perkins Coie LLP

(57) ABSTRACT

A system can correct or avoid an unexpected result caused by executing a smart contract. The system can detect a potential/actual result generated based on a primary smart contract, which is stored in association with a block of a blockchain and is configured to execute when a predetermined condition is satisfied. The system can determine that the potential/actual result deviates from an expected result and, in response, retrieve a secondary smart contract from a repository. The secondary smart contract is selected to prevent the unexpected result in the future. The system can store the secondary smart contract retrieved from the repository in association with a subsequent block of the blockchain. The primary smart contract and the secondary smart contract are then configured to execute in concert when the predetermined condition is satisfied such that the expected result is produced instead of the unexpected result.

17 Claims, 5 Drawing Sheets

(56) References Cited

U.S. PATENT DOCUMENTS

| | | | |
|---|---|---|---|
| 11,611,445 B2* | 3/2023 | Baykaner | G06Q 20/02 |
| 2017/0308431 A1* | 10/2017 | Otterstedt | H03M 13/2903 |
| 2019/0236559 A1 | 8/2019 | Padmanabhan | |
| 2019/0303623 A1 | 10/2019 | Reddy et al. | |
| 2020/0235947 A1* | 7/2020 | Baykaner | H04L 9/3236 |
| 2020/0285633 A1* | 9/2020 | Zhuo | H04L 9/0637 |
| 2021/0004216 A1* | 1/2021 | Chang | G06F 8/65 |
| 2021/0149880 A1 | 5/2021 | Ivkushkin et al. | |
| 2021/0374731 A1 | 12/2021 | Kim | |
| 2022/0029810 A1 | 1/2022 | Tang et al. | |
| 2022/0318399 A1* | 10/2022 | Rodler | G06F 21/51 |

FOREIGN PATENT DOCUMENTS

| | | |
|---|---|---|
| CN | 111066047 A | 4/2020 |
| CN | 111417946 A | 7/2020 |
| CN | 107317730 B | 9/2020 |
| CN | 111738480 A | 10/2020 |
| CN | 111767555 A | 10/2020 |
| CN | 111861465 A | 10/2020 |
| CN | 112085600 A | 12/2020 |
| CN | 112602083 A | 4/2021 |
| CN | 110692228 B | 2/2022 |
| DE | 102016109209 A1 | 11/2017 |
| DE | 102017005623 A1 | 12/2018 |
| DE | 102017212904 A1 | 1/2019 |
| DE | 102017223522 A1 | 6/2019 |
| DE | 102018002466 A1 | 9/2019 |
| DE | 102020100787 A1 | 7/2020 |
| DE | 102019000985 A1 | 8/2020 |
| DE | 102019202381 A1 | 8/2020 |
| DE | 102019006333 A1 | 3/2021 |
| DE | 112018007724 T5 | 3/2021 |
| DE | 102020113057 A1 | 11/2021 |
| DE | 102020113557 A1 | 11/2021 |
| DE | 102021109517 A1 | 12/2021 |
| EP | 3396575 B1 | 11/2019 |
| EP | 3654197 A1 | 5/2020 |
| EP | 3688717 A1 | 8/2020 |
| EP | 3769243 A1 | 1/2021 |
| EP | 3499789 B1 | 6/2021 |
| EP | 3841496 A1 | 6/2021 |
| EP | 3860043 A2 | 8/2021 |
| EP | 3673432 B1 | 11/2021 |
| EP | 3905165 A1 | 11/2021 |
| EP | 3821578 B1 | 2/2022 |
| EP | 3896894 B1 | 8/2022 |
| JP | 6638024 B2 | 12/2019 |
| JP | 2020501402 A | 1/2020 |
| JP | 2020510906 A | 4/2020 |
| JP | 7012730 B2 | 1/2022 |
| KR | 102030171 B1 | 10/2019 |
| KR | 102139551 B1 | 7/2020 |
| WO | 2018111295 A1 | 6/2018 |
| WO | 2019058340 A1 | 3/2019 |
| WO | 2019191515 A1 | 10/2019 |
| WO | 2020095226 A1 | 5/2020 |
| WO | 2020145591 A1 | 7/2020 |
| WO | 2021032192 A1 | 2/2021 |
| WO | 2022200035 A1 | 9/2022 |

* cited by examiner

TECHNIQUES FOR CORRECTING ANOMALOUS ACTIVITY CAUSED BY SMART CONTRACTS

BACKGROUND

A blockchain is a growing list of records, called blocks, that are securely linked together. Each block contains a hash of the previous block, a timestamp, and transaction data. The timestamp proves that the transaction data existed when the block was published to get into its hash. Since blocks each contain information about the block before it, they form a chain, where each additional block reinforces the prior blocks. Therefore, blockchains are resistant to modification of their data because once recorded, the data in any given block cannot be altered retroactively without altering all subsequent blocks. Blockchains are typically managed by a peer-to-peer network for use as a publicly distributed ledger, where nodes collectively adhere to a protocol to communicate and validate new blocks.

A smart contract is a computer program or a transaction protocol stored on a blockchain and intended to automatically execute when predetermined conditions are met. A smart contract can control or document legally relevant events and actions according to the terms of a contract or an agreement. After a smart contract runs, it updates the blockchain with the transaction, which shields the transaction from future attempts at manipulation. One goal of using smart contracts is to reduce the need for trusted intermediators, arbitrations and enforcement costs, fraud losses, and malicious and accidental exceptions.

BRIEF DESCRIPTION OF THE DRAWINGS

Detailed descriptions of implementations of the present invention will be described and explained through the use of the accompanying drawings.

Figure 1:
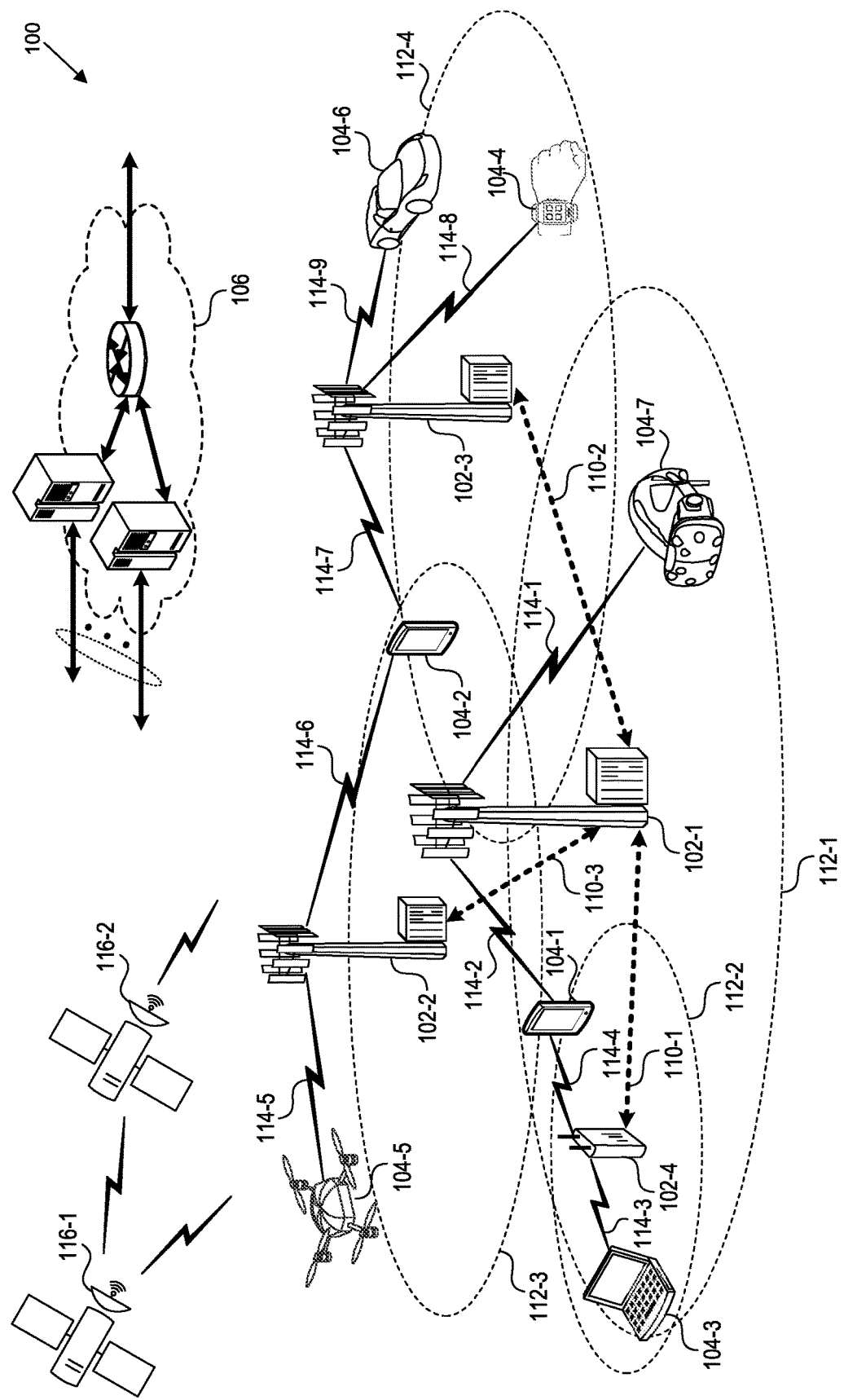
FIG. 1 is a block diagram that illustrates a wireless communications system that can implement aspects of the present technology.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

The disclosed technology uses a second smart contract to correct a function (or output) associated with a first smart contract, where the actual function deviates from an expected function. The second smart contract changes the function associated with the first smart contract without needing to delete or replace the first smart contract. In general, a smart contract is an immutable program that is stored on a blockchain. The smart contract runs when one or more predetermined conditions are satisfied in a particular context to execute a function or produce an output. A context can include a software program that is linked to or used by the smart contract to execute a function or produce an output. In one example, a condition of a smart contract is satisfied when a source program outputs a particular value. The source program can include a mobile application ("app") running on a wireless handheld device. When the context changes, the smart contract can fail to function or produce a desired output. Since the smart contract cannot be rewritten in a blockchain environment, the change in context results in an undesired function/output that could leave the source program or related program at risk of losing some, or all, of its functionality.

Prior solutions include simulation tools that can simulate execution of a given source program to determine whether the source program will halt or malfunction under a particular context. However, a simulator is inadequate in addressing failed smart contracts for at least two reasons. First, a smart contract that is malfunctioning does not necessarily halt the entire source program. Thus, the simulator may not recognize an error. Second, the simulator does not run in real-time to monitor and address malfunctions that appear during normal operation of the program. The disclosed technology addresses at least these issues by, for example, monitoring the program in real-time or near real-time, identifying the need for a secondary smart contract, selecting the secondary smart contract, and depositing the secondary smart contract as needed to cure the problem associated with the primary smart contract.

The technology can include a repository (e.g., datastore) that is configured to store multiple secondary smart contracts. A particular secondary smart contract stored in the repository can be selected, copied, and applied to fix or patch the function of a primary smart contract stored in association with a blockchain. The repository is accessible by a device that executes or supports a source program (e.g., a mobile app) that uses a smart contract to perform a function. As such, the second smart contract is selected from the repository specifically to fix the first smart contract. In one example, a controlling program ("controller") can select a secondary smart contract by communicating with the repository and perform an index and pointer method, where the secondary smart contracts stored at the repository are indexed and a pointer directs the controller to a specific location in the repository for a suitable secondary smart contract that can fix a primary smart contract. When the primary smart contract malfunctions, the controlling program points to a new smart contract stored in the repository. The new smart contract is then deposited or linked to the blockchain where the primary smart contract resides. The secondary smart contract is selected such that the secondary and primary smart contracts execute when the same, similar, or related conditions are satisfied to return a source program to its proper function. As such, the secondary smart contract cures the malfunctioning activity of the primary smart contract.

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail, to avoid unnecessarily obscuring the descriptions of examples.

Wireless Communications System

FIG. 1 is a block diagram that illustrates a wireless telecommunication network 100 ("network 100") in which aspects of the disclosed technology are incorporated. The network 100 includes base stations 102-1 through 102-4 (also referred to individually as "base station 102" or collectively as "base stations 102"). A base station is a type of network access node (NAN) that can also be referred to as a cell site, a base transceiver station, or a radio base station. The network 100 can include any combination of NANs including an access point, radio transceiver, gNodeB (gNB), NodeB, eNodeB (eNB), Home NodeB or Home eNodeB, or the like. In addition to being a wireless wide area network (VVWAN) base station, a NAN can be a wireless local area network (WLAN) access point, such as an Institute of Electrical and Electronics Engineers (IEEE) 802.11 access point.

The NANs of a network 100 formed by the network 100 also include wireless devices 104-1 through 104-7 (referred to individually as "wireless device 104" or collectively as "wireless devices 104") and a core network 106. The wireless devices 104-1 through 104-7 can correspond to or include network 100 entities capable of communication using various connectivity standards. For example, a 5G communication channel can use millimeter wave (mmW) access frequencies of 28 GHz or more. In some implementations, the wireless device 104 can operatively couple to a base station 102 over a long-term evolution/long-term evolution-advanced (LTE/LTE-A) communication channel, which is referred to as a 4G communication channel.

The core network 106 provides, manages, and controls security services, user authentication, access authorization, tracking, Internet Protocol (IP) connectivity, and other access, routing, or mobility functions. The base stations 102 interface with the core network 106 through a first set of backhaul links (e.g., S1 interfaces) and can perform radio configuration and scheduling for communication with the wireless devices 104 or can operate under the control of a base station controller (not shown). In some examples, the base stations 102 can communicate with each other, either directly or indirectly (e.g., through the core network 106), over a second set of backhaul links 110-1 through 110-3 (e.g., X1 interfaces), which can be wired or wireless communication links.

The base stations 102 can wirelessly communicate with the wireless devices 104 via one or more base station antennas. The cell sites can provide communication coverage for geographic coverage areas 112-1 through 112-4 (also referred to individually as "coverage area 112" or collectively as "coverage areas 112"). The geographic coverage area 112 for a base station 102 can be divided into sectors making up only a portion of the coverage area (not shown). The network 100 can include base stations of different types (e.g., macro and/or small cell base stations). In some implementations, there can be overlapping geographic coverage areas 112 for different service environments (e.g., Internet-of-Things (IoT), mobile broadband (MBB), vehicle-to-everything (V2X), machine-to-machine (M2M), machine-to-everything (M2X), ultra-reliable low-latency communication (URLLC), machine-type communication (MTC), etc.).

The network 100 can include a 5G network 100 and/or an LTE/LTE-A or other network. In an LTE/LTE-A network, the term eNB is used to describe the base stations 102, and in 5G new radio (NR) networks, the term gNBs is used to describe the base stations 102 that can include mmW communications. The network 100 can thus form a heterogeneous network 100 in which different types of base stations provide coverage for various geographic regions. For example, each base station 102 can provide communication coverage for a macro cell, a small cell, and/or other types of cells. As used herein, the term "cell" can relate to a base station, a carrier or component carrier associated with the base station, or a coverage area (e.g., sector) of a carrier or base station, depending on context.

A macro cell generally covers a relatively large geographic area (e.g., several kilometers in radius) and can allow access by wireless devices that have service subscriptions with a wireless network 100 service provider. As indicated earlier, a small cell is a lower-powered base station, as compared to a macro cell, and can operate in the same or different (e.g., licensed, unlicensed) frequency bands as macro cells. Examples of small cells include pico cells, femto cells, and micro cells. In general, a pico cell can cover a relatively smaller geographic area and can allow unrestricted access by wireless devices that have service subscriptions with the network 100 provider. A femto cell covers a relatively smaller geographic area (e.g., a home) and can provide restricted access by wireless devices having an association with the femto unit (e.g., wireless devices in a closed subscriber group (CSG), wireless devices for users in the home). A base station can support one or multiple (e.g., two, three, four, and the like) cells (e.g., component carriers). All fixed transceivers noted herein that can provide access to the network 100 are NANs, including small cells.

The communication networks that accommodate various disclosed examples can be packet-based networks that operate according to a layered protocol stack. In the user plane, communications at the bearer or Packet Data Convergence Protocol (PDCP) layer can be IP-based. A Radio Link Control (RLC) layer then performs packet segmentation and reassembly to communicate over logical channels. A Medium Access Control (MAC) layer can perform priority handling and multiplexing of logical channels into transport channels. The MAC layer can also use Hybrid ARQ (HARQ) to provide retransmission at the MAC layer, to improve link efficiency. In the control plane, the Radio Resource Control (RRC) protocol layer provides establishment, configuration, and maintenance of an RRC connection between a wireless device 104 and the base stations 102 or core network 106 supporting radio bearers for the user plane data. At the Physical (PHY) layer, the transport channels are mapped to physical channels.

Wireless devices can be integrated with or embedded in other devices. As illustrated, the wireless devices 104 are distributed throughout the wireless telecommunications network 100, where each wireless device 104 can be stationary or mobile. For example, wireless devices can include handheld mobile devices 104-1 and 104-2 (e.g., smartphones, portable hotspots, tablets, etc.); laptops 104-3; wearables 104-4; drones 104-5; vehicles with wireless connectivity 104-6; head-mounted displays with wireless augmented reality/virtual reality (ARNR) connectivity 104-7; portable gaming consoles; wireless routers, gateways, modems, and other fixed-wireless access devices; wirelessly connected sensors that provides data to a remote server over a network; IoT devices such as wirelessly connected smart home appliances, etc.

A wireless device (e.g., wireless devices 104-1, 104-2, 104-3, 104-4, 104-5, 104-6, and 104-7) can be referred to as a user equipment (UE), a customer premise equipment (CPE), a mobile station, a subscriber station, a mobile unit, a subscriber unit, a wireless unit, a remote unit, a handheld mobile device, a remote device, a mobile subscriber station, terminal equipment, an access terminal, a mobile terminal, a wireless terminal, a remote terminal, a handset, a mobile client, a client, or the like.

A wireless device can communicate with various types of base stations and network 100 equipment at the edge of a network 100 including macro eNBs/gNBs, small cell eNBs/gNBs, relay base stations, and the like. A wireless device can also communicate with other wireless devices either within or outside the same coverage area of a base station via device-to-device (D2D) communications.

The communication links 114-1 through 114-9 (also referred to individually as "communication link 114" or collectively as "communication links 114") shown in network 100 include uplink (UL) transmissions from a wireless device 104 to a base station 102, and/or downlink (DL) transmissions from a base station 102 to a wireless device 104. The downlink transmissions can also be called forward link transmissions while the uplink transmissions can also be called reverse link transmissions. Each communication link 114 includes one or more carriers, where each carrier can be a signal composed of multiple sub-carriers (e.g., waveform signals of different frequencies) modulated according to the various radio technologies. Each modulated signal can be sent on a different sub-carrier and carry control information (e.g., reference signals, control channels), overhead information, user data, etc. The communication links 114 can transmit bidirectional communications using frequency division duplex (FDD) (e.g., using paired spectrum resources) or time division duplex (TDD) operation (e.g., using unpaired spectrum resources). In some implementations, the communication links 114 include LTE and/or mmW communication links.

In some implementations of the network 100, the base stations 102 and/or the wireless devices 104 include multiple antennas for employing antenna diversity schemes to improve communication quality and reliability between base stations 102 and wireless devices 104. Additionally or alternatively, the base stations 102 and/or the wireless devices 104 can employ multiple-input, multiple-output (MIMO) techniques that can take advantage of multi-path environments to transmit multiple spatial layers carrying the same or different coded data.

In some examples, the network 100 implements 6G technologies including increased densification or diversification of network nodes. The network 100 can enable terrestrial and non-terrestrial transmissions. In this context, a Non-Terrestrial Network (NTN) is enabled by one or more satellites such as satellite 116 to deliver services anywhere and anytime and provide coverage in areas that are unreachable by any conventional Terrestrial Network (TN). The 6G network 100 can implement terahertz (THz) communications. This can support wireless applications that demand ultra-high quality of service requirements and multi-terabits per second data transmission in the 6G and beyond era, such as terabit-per-second backhaul systems, ultrahigh-definition content streaming among mobile devices, virtual/augmented reality, and wireless high-bandwidth secure communications.

Figure 2:
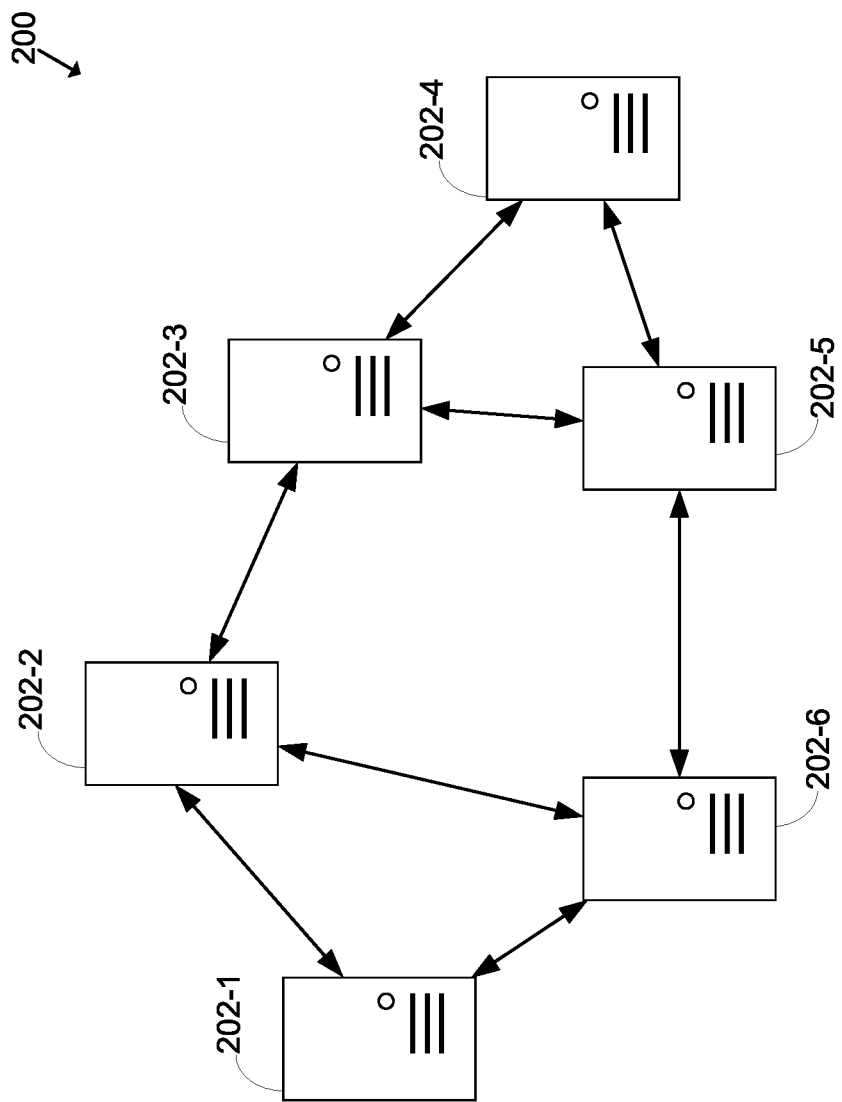
FIG. 2 illustrates a blockchain network that is associated with smart contracts that can implement aspects of the present technology.

FIG. 2 illustrates a blockchain network that is associated with smart contracts that can implement aspects of the present technology. A blockchain network includes multiple nodes (e.g., servers) that each maintain respective copies of a blockchain, such as the blockchain network 200. In actual practice, blockchain network may include hundreds or thousands of nodes operating as a distributed peer-to-peer network. Nodes of the network implement known consensus algorithms to validate transactions submitted to the blockchain network. A verified transaction may include transferred cryptocurrency, contracts, records, or other information to be recorded to the blockchain. In some embodiments, multiple transactions are combined together into a block of data that is verified across the nodes of the blockchain network. Once verified, this block of data can be added to an existing blockchain maintained by each of the nodes.

A blockchain is analogous to a distributed database on a distributed computing network that maintains a continuously growing list of ordered records called blocks. A block of a blockchain includes records of transaction(s) or other recorded data (e.g., smart contracts). Smart contracts are simply programs stored on a blockchain that run when predetermined conditions are met. They can be used to automate the execution of an agreement so that all participants can be immediately certain of the outcome, without any intermediary's involvement or time loss. Each block contains at least one timestamp, and a block links to a previous block to thus form a chain of blocks. Blockchains are inherently resistant to modification of their recorded data. In particular, once recorded, the data in a block cannot be altered retroactively. Through a peer network and distributed timestamping, a blockchain is managed in an autonomous manner.

Decentralized consensus can be achieved with a blockchain. This makes blockchains suitable for recording smart contracts. Well-known examples of decentralized networks that implement blockchains include the Bitcoin crypto-asset and cryptocurrencies such as Ethereum. These types of networks provide a pragmatic solution for arriving at a consensus in the face of trust and timing problems typically encountered in distributed networks.

The blockchain network 200 is a cryptographically secured and distributed peer-to-peer network. As shown, the blockchain network 200 interconnects peer nodes 202-1 through 202-6 (also referred to collectively as "peer nodes 202" and individually as "peer node 202"). The peer nodes 202 can be distributed across various geographic locations including regions all over the world. The network 200 can include a combination of private, public, wired, or wireless portions. Data communicated over the blockchain network 200 can be encrypted or unencrypted at various locations or portions of the network 200. Each peer node 202 can include combinations of hardware and/or software to process data, perform functions, communicate over the network 200, and the like.

The peer nodes 202 can include computing devices such as servers, desktop or laptop computers, handheld mobile devices (e.g., smartphones, smartwatches), and any other electronic device. Any component of the network 200 can include a processor, memory or storage, a network transceiver, a display, operating system and application software (e.g., for providing a user interface), and the like. Other components, hardware, and/or software included in the blockchain network 200 that are well known to persons skilled in the art are not shown or discussed herein for the sake of brevity.

The blockchain network 200 allows for the secure management of a shared ledger, where smart contracts are verified and stored on the blockchain network 200 without a governing central authority. Blockchains can be implemented in different configurations, ranging from public, open-source networks to private blockchains that require explicit permission to read or write transactions. Central to a blockchain are cryptographic hash functions that secure the blockchain network 200, in addition to enabling transactions, to protect a blockchain's integrity and anonymity.

The blockchain network 200 uses cryptography to securely process data. For example, public-key cryptography uses asymmetric key algorithms, where a key used by one party to perform either encryption or decryption is not the same as the key used by another in the counterpart operation. Each party has a pair of cryptographic keys: a public encryption key and a private decryption key. For example, a key pair used for digital signatures consists of a private signing key and a public verification key. The public key can be widely distributed, while the private key is known only to its proprietor. The keys are related mathematically, but the parameters are chosen so that calculating the private key from the public key is unfeasible. The keys could be expressed in various formats, including hexadecimal format.

Figure 3:
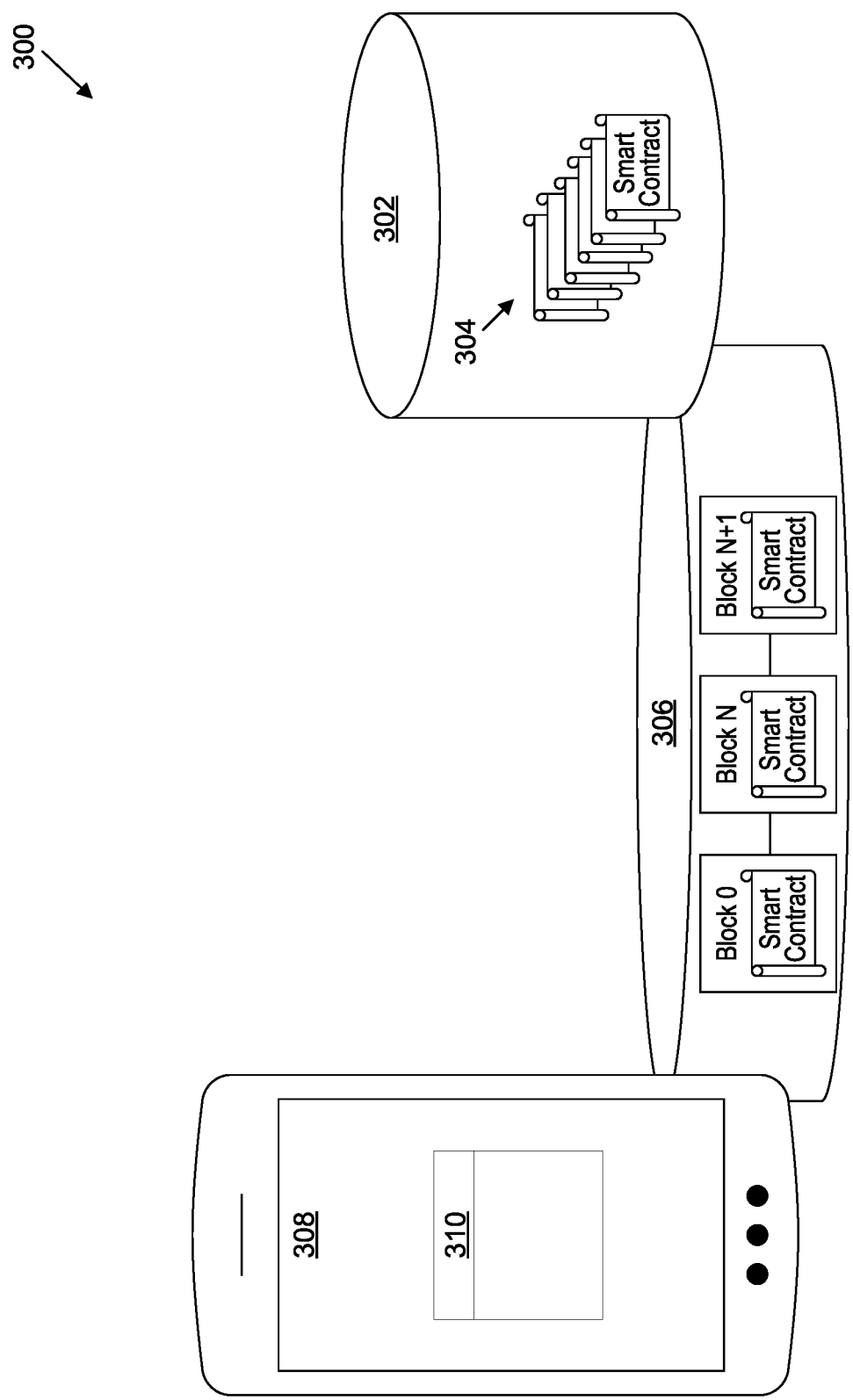
FIG. 3 illustrates a system configured to restore the effect of a primary smart contract with a secondary smart contract.

FIG. 3 illustrates a system 300 configured to restore the effect of a primary smart contract with a secondary smart contract. Once written and compiled in a blockchain, smart contracts are immutable. This provides security and consistent action but renders the code inflexible to accommodate alternative instructions and cannot adjust dynamically. Further, a smart contract cannot be programmed to dynamically refer to another smart contract. The system 300 overcomes these drawbacks.

The system 300 includes components that exist outside of functional or operational chains that act as references to in-chain smart contracts. The system 300 includes a repository 302 (e.g., datastore) that is configured to store multiple secondary smart contracts 304. A particular secondary smart contract stored in the repository 302 can be copied and applied to fix the function of a primary smart contract stored in association with a blockchain 306. The repository 302 is accessible by a user device 308 (e.g., wireless device) that executes or supports a software program 310 (e.g., mobile app), which uses a smart contract to perform a function. A second smart contract is selected from the repository 302 specifically to fix the effect of the first smart contract. The secondary smart contract is deposited or linked in association with a block of the blockchain 306 where the primary smart contract resides on an earlier block. The secondary smart contract is selected so that the secondary and primary smart contracts execute jointly when a condition is satisfied by the software program 310 to restore the effect of the primary smart contract.

The system 300 enables a smart contract to establish a programmed secure network link between a secondary smart contract and a primary smart contract. A handshake can establish and test for a persistent logical connection. In one example, The system 300 can establish a protocol that can test for the presence of a digital signature that establishes that the software program 310 is running from block to block. If the digital signature is evident in the last deposited block, the chain can continue.

The system 300 can also include an index and pointer mechanism (not shown) that can be used to request a secondary smart contract upon which to act in concert with a primary smart contract, and then deposit the secondary smart contract into the block of the blockchain 306. In one example, the system 300 can use a specialized smart contract that is configured to test intermittently during runtime of the associated software program whether the potential or actual effect of the primary smart contract differs from the expected effect.

Figure 4:
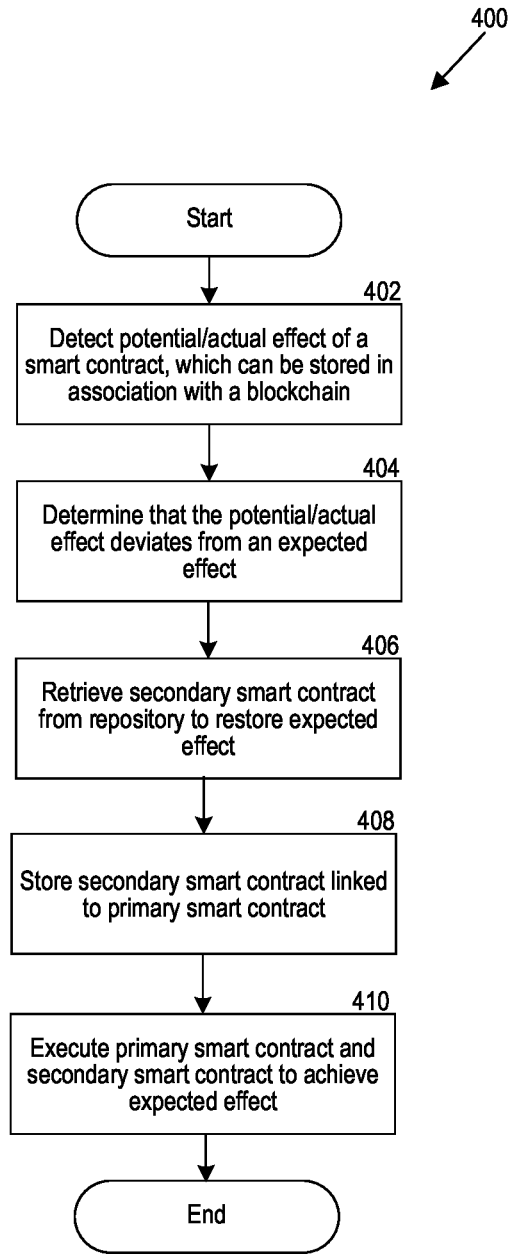
FIG. 4 is a flowchart that illustrates a process performed by a system to restore an effect of a smart contract by jointly executing a secondary smart contract.

FIG. 4 is a flowchart that illustrates a process performed by a system to restore an effect of a smart contract by jointly executing a secondary smart contract. The system can include at least one hardware processor and at least one non-transitory memory storing instructions, which, when executed by the at least one hardware processor, cause the system to perform the process 400. The system can include a wireless device (e.g., a smartphone) and/or one or more servers and devices of a network (e.g., telecommunications network). In one example, the process 400 is performed entirely by the wireless device.

At 402, the system can detect a potential or actual effect of a smart contract. For example, the system can detect a result that is generated based on execution of a smart contract in response to a predetermine condition being satisfied by a software program on a wireless device. The smart contract is stored in association with a block of a blockchain (e.g., on a block of the blockchain) and configured to execute when the predetermined condition is satisfied by a function or software program to produce an expected effect (e.g., result). In one example, the software program is stored on the wireless device that is subscribed to a telecommunications network and a potential/actual result is of an operation of a communications function of the wireless device, or an output of a mobile app.

At 404, the system determines that the potential/actual effect deviates from the expected effect. In other words, the system determines an anomalous effect. An anomalous effect can include a result that is different than what is intended or expected, though not necessarily harmful or malicious. For example, a software program that is running on a smartphone can perform a function that satisfies a predetermined condition that is configured to execute the smart contract to produce a desired result. The software program is mutable while the smart contract is immutable. As such, the software program could change such that execution of the smart contract could produce an undesired result. To determine the anomalous effect, the system can perform a test. For example, the system can test the software program at runtime to determine a test result of the smart contract. The system can compare the test result to the expected result to determine an unexpected effect. In one example, the system can test the software program at runtime on the wireless device to determine that the test result of the smart contract matches the desired result.

At 406, in response to the anomaly being determined, the system issues a request to retrieve a secondary smart contract from a repository, where the secondary smart contract can restore the expected effect. The repository can be maintained at a centralized server or registered in accordance with a protocol on a peer-to-peer network for sharing data in a distributed file system that includes multiple secondary smart contracts. The system can establish a secure network link between the device storing the smart contract (e.g., the wireless device) and the repository storing the secondary smart contracts. In one example, the system performs a handshake operation to test for a persistent logical connection between the wireless device storing smart contract and the repository. As such, the wireless device is linked to the repository to retrieve secondary smart contracts. In another example, the (primary) smart contract and the repository storing one or more secondary smart contracts are co-located at the wireless device.

The secondary smart contract is selected from among multiple secondary smart contracts stored at the repository to correct or compensate for an anomaly caused by the primary smart contract to restore the expected effect. In one example, the system can select the secondary smart contract from among the multiple smart contracts stored in a centralized repository so that the secondary smart contract operates as a patch for the primary smart contract. In one example, the system retrieves the secondary smart contract from the repository by searching an index of multiple secondary smart contracts based on a criterion of the primary smart contract. The index can be located at the wireless device and include pointers from the multiple secondary smart contracts to locations of the repository storing the multiple secondary smart contracts. The secondary smart contract can thus be retrieved from a location of the repository based on a pointer of the index.

In one implementation, the system can store indications of requests for secondary smart contracts in a memory of the system. The requests activity can be deposited in a separate chain register for future information regarding frequency and type of reference requests of secondary smart contracts. The stored indications can thus be useful for debugging primary smart contracts and for new programming tasks.

At 408, the system stores the secondary smart contract in a manner that is available for orchestrated operation with the (primary) smart contract. The system can store the secondary smart contract retrieved from the repository in association with a block of the blockchain, such as on a block of the blockchain that is subsequent to the block storing the primary smart contract. In one example, both the primary and secondary smart contracts are hosted on a memory of the wireless device. In another example, the primary smart contract is hosted on a memory of the wireless device while the secondary smart contract of the repository is hosted on a memory located remote from the wireless device, or remains maintained at the repository.

At 410, in response to the same predetermined condition of 402 being satisfied by the software program, the secondary smart contract augments the function of the primary smart contract to collectively produce the expected result. As such, the secondary smart contract restores the intended effect of the primary smart contract, which thereby overcomes the limitation of the primary smart contract being immutable (due to the blocks of the blockchain being immutable). As such, the system determines whether a primary smart contract causes an anomalous result, but then uses a secondary smart contract to restore the intended result of the primary smart contract, which otherwise cannot be changed to cure the anomaly. The secondary smart contract is thus selected to counteract the undesired effect caused by execution of the primary smart contract.

The system can secure the orchestrated operation of the secondary smart contract to compensate for the primary smart contract. For example, the system can retrieve the secondary smart contract from the repository and cause storage of the secondary smart contract in a block of the blockchain that is temporally subsequent to the block of the blockchain storing the primary smart contract. The system can test for the presence of a digital signature in a prior block to validate further operation of the blockchain with subsequent blocks. In particular, the system can validate the presence of a digital signature in a prior block associated with the primary smart contract to authorize operation of the secondary smart contract stored in association with the subsequent block. In another example, the primary smart contract located at the wireless device can be linked over a secured network to a selected secondary smart contract stored at the repository to maintain concerted execution without needing to be co-located in the same device or blockchain.

The process 400 can be implemented to address a variety of different scenarios. In one implementation, the system can correct errors caused by a smart contract. For example, the system can detect an error that results from a software program satisfying a predetermined condition of a primary smart contract. In response, the system selects a secondary smart contract from among multiple smart contracts stored at a repository, where the secondary smart contracts are configured to correct errors caused by execution of other smart contracts. The system can thus cause the primary smart contract and the secondary smart contract to execute in a concerted manner when the predetermined condition is satisfied by the software program, which corrects the error.

The disclosed technology can include additional features or improvements that are within the scope of this disclosure. For example, the system can chain multiple secondary smart contracts or dynamically exchange or group secondary smart contracts to achieve an intended effect of a primary smart contract. For example, the system can select three smart contracts that, when executed in concert, achieve a desired outcome when a first software program satisfies a predetermined condition. The system can select a different combination of three or more (or fewer) secondary smart contracts that, when executed in concert, achieve the same desired outcome when a second software program satisfies the same predetermined condition. In one example, the secondary software program is an updated version of the first software program. Thus, the disclosed technology can provide consistent results when using the same smart contract in different contexts.

Computer System

Figure 5:
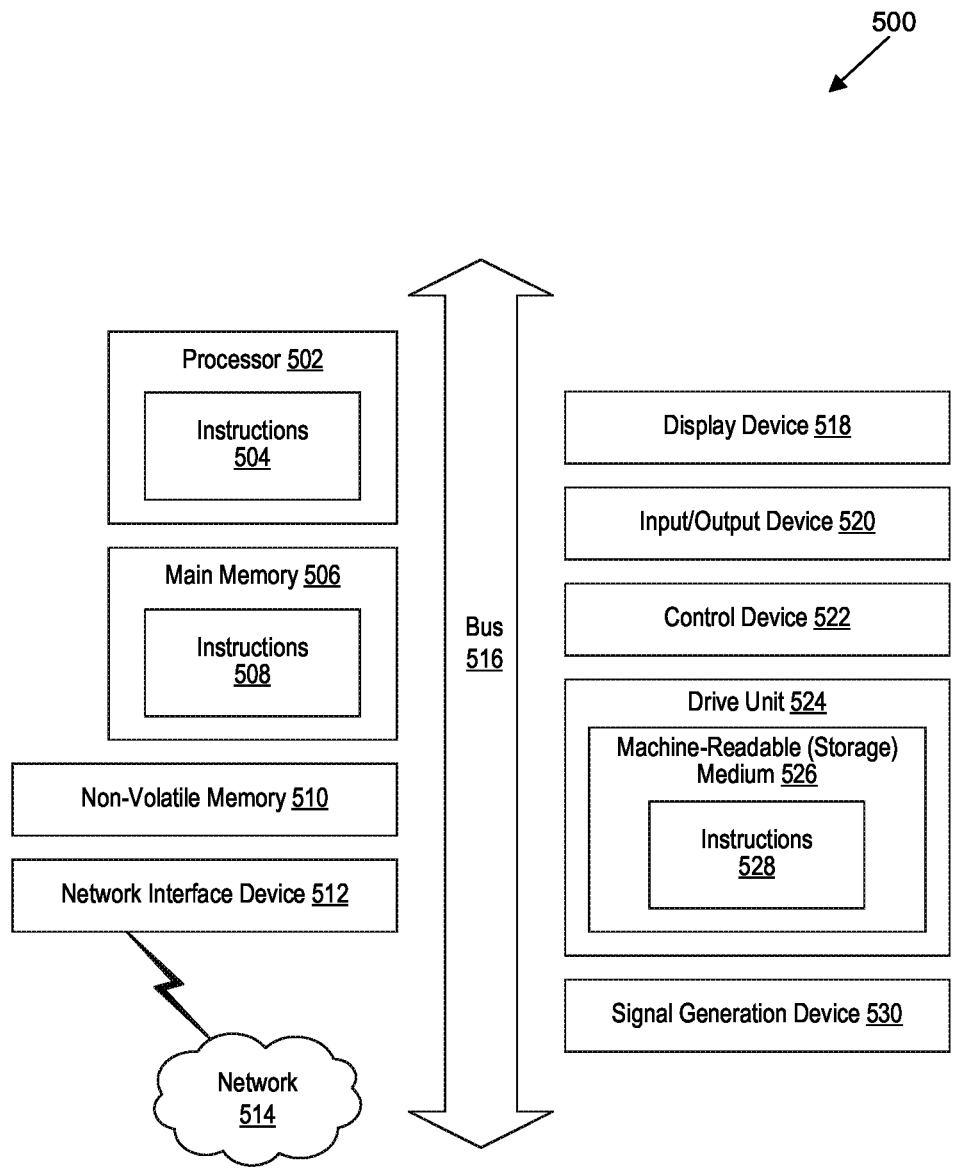
FIG. 5 is a block diagram that illustrates an example of a computer system in which at least some operations described herein can be implemented.

FIG. 5 is a block diagram that illustrates an example of a computer system 500 in which at least some operations described herein can be implemented. As shown, the computer system 500 can include: one or more processors 502, main memory 506, non-volatile memory 510, a network interface device 512, video display device 518, an input/output device 520, a control device 522 (e.g., keyboard and pointing device), a drive unit 524 that includes a storage medium 526, and a signal generation device 530 that are communicatively connected to a bus 516. The bus 516 represents one or more physical buses and/or point-to-point connections that are connected by appropriate bridges, adapters, or controllers. Various common components (e.g., cache memory) are omitted from FIG. 5 for brevity. Instead, the computer system 500 is intended to illustrate a hardware device on which components illustrated or described relative to the examples of the figures and any other components described in this specification can be implemented.

The computer system 500 can take any suitable physical form. For example, the computing system 500 can share a similar architecture as that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computing system 500. In some implementation, the computer system 500 can be an embedded computer system, a system-on-chip (SOC), a single-board computer system (SBC) or a distributed system such as a mesh of computer systems or include one or more cloud components in one or more networks. Where appropriate, one or more computer systems 500 can perform operations in real-time, near real-time, or in batch mode.

The network interface device 512 enables the computing system 500 to mediate data in a network 514 with an entity that is external to the computing system 500 through any communication protocol supported by the computing system 500 and the external entity. Examples of the network interface device 512 include a network adaptor card, a wireless network interface card, a router, an access point, a wireless router, a switch, a multilayer switch, a protocol converter, a gateway, a bridge, bridge router, a hub, a digital media receiver, and/or a repeater, as well as all wireless elements noted herein.

The memory (e.g., main memory 506, non-volatile memory 510, machine-readable medium 526) can be local, remote, or distributed. Although shown as a single medium, the machine-readable medium 526 can include multiple media (e.g., a centralized/distributed database and/or associated caches and servers) that store one or more sets of instructions 528. The machine-readable (storage) medium 526 can include any medium that is capable of storing, encoding, or carrying a set of instructions for execution by the computing system 500. The machine-readable medium 526 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory devices 510, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 504, 508, 528) set at various times in various memory and storage devices in computing device(s). When read and executed by the processor 502, the instruction(s) cause the computing system 500 to perform operations to execute elements involving the various aspects of the disclosure.

Remarks

The terms "example", "embodiment" and "implementation" are used interchangeably. For example, reference to "one example" or "an example" in the disclosure can be, but not necessarily are, references to the same implementation; and, such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described which can be exhibited by some examples and not by others. Similarly, various requirements are described which can be requirements for some examples but no other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples, but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a mean-plus-function claim will use the words "means for." However, the use of the term "for" in any other context is not intended to invoke a similar interpretation. The applicant reserves the right to pursue such additional claim forms in either this application or in a continuing application.

I claim:

1. A method performed by a system associated with a telecommunications network to restore an expected effect caused by executing a smart contract, the method comprising:
   detecting a potential or actual effect caused in response to executing a primary smart contract,
      wherein the primary smart contract is stored in association with a first block of a blockchain and configured to execute when a predetermined condition is satisfied by a software program to produce an expected effect, and
      wherein the software program is stored at a wireless device that is subscribed to the telecommunications network;
   determining that the potential or actual effect deviates from the expected effect;
   in response to determining that the potential or actual effect deviates from the expected effect, retrieving a secondary smart contract from a repository,
      wherein the secondary smart contract is selected from among multiple secondary smart contracts stored at the repository to restore the expected effect of the primary smart contract when the predetermined condition is satisfied by a software program; and
   causing storage of the secondary smart contract in association with a second block of the blockchain subsequent to the first block;
      wherein the primary smart contract and the secondary smart contract are configured to execute in concert when the predetermined condition is satisfied by the software program to jointly produce the expected effect.

2. The method of claim 1 further comprising:
   jointly execute the primary smart contract and the secondary smart contract in response to the predetermined condition being satisfied by the software program to produce the expected effect.

3. The method of claim 1, wherein retrieving the secondary smart contract from the repository comprises:
   selecting the secondary smart contract from among the multiple smart contracts to operate as a patch for the smart contract.

4. The method of claim 1, wherein to determine that the potential or actual effect deviates from the expected effect comprises:
   testing the software program at runtime to determine a test result of the primary smart contract; and
   detecting that the test result deviates from an expected result.

5. The method of claim 1 further comprising:
   hosting the primary smart contract on a memory of the wireless device; and
   hosting the repository on the memory of the wireless device.

6. The method of claim 1 further comprising:
   hosting the primary smart contract on a memory of the wireless device; and
   hosting the repository on a memory of a server located remote from the wireless device.

7. The method of claim 1, wherein retrieving the secondary smart contract from the repository comprises:
   searching an index of the multiple secondary smart contracts based on a criterion of the first smart contract,
      wherein the index includes pointers from the multiple secondary smart contracts to locations of the repository storing the multiple secondary smart contracts; and
   retrieving the secondary smart contract from a location of the repository based on a pointer of the index.

8. The method of claim 1 further comprising, prior to detecting the potential or actual effect of the primary smart contract:
   establish a secure network link between the primary smart contract and the repository storing the multiple secondary smart contracts; and
   performing a handshake operation to test for a persistent logical connection between the primary smart contract and the repository.

9. The method of claim 1:
   wherein the expected effect occurs when the predetermined condition is satisfied by a first version of the software program, and
   wherein an unexpected effect occurs when the predetermined condition is satisfied by a second version of the software program different from the first version of the software program.

10. The method of claim 1, wherein the primary smart contract is stored in the first block of the blockchain and the secondary smart contract is stored in the second block of the blockchain, the method further comprising:
    validating presence of a digital signature in the first block to authorize orchestrated execution of the secondary smart contract with the primary smart contract.

11. The method of claim 1 further comprising, prior to causing storage of the secondary smart contract in association with the second block of the blockchain:
    validating presence of a digital signature in the first block of the blockchain associated with the primary smart contract.

12. The method of claim 1, wherein the potential or actual effect is associated with an operation of a communication function of the wireless device or an output of the software program in response to an input received over the telecommunications network.

13. A non-transitory computer-readable storage medium storing instructions, which, when executed by at least one data processor of a wireless device subscribed to a telecommunications network, cause the wireless device to:

cause storage of a primary smart contract in association with a block of a blockchain,
    wherein the primary smart contract is configured to execute when a predetermined condition is satisfied by a software program stored at the wireless device to produce an expected result;
detect an error in response to the primary smart contract being executed;
in response to the error being detected, select a secondary smart contract stored at a repository,
    wherein the repository stores multiple secondary smart contracts configured to correct errors caused by execution of smart contracts, and
    wherein the secondary smart contract is selected to correct the error caused by execution of the primary smart contract; and
cause orchestrated execution of the primary smart contract and the secondary smart contract when the predetermined condition is satisfied by the software program to prevent the error.

14. The computer-readable storage medium of claim 13 further causing the wireless device to:
    retrieve the secondary smart contract from the repository; and
    cause storage of the secondary smart contract in association with a subsequent block of the blockchain.

15. The computer-readable storage medium of claim 13 further causing the wireless device to:
    link the primary smart contract located at the wireless device and the secondary smart contract stored at the repository such that the primary smart contract and the secondary smart contract are capable of orchestrated execution.

16. The computer-readable storage medium of claim 13 further causing the wireless device to:
    host the primary smart contract on a memory of the wireless device; and
    host the repository on the memory of the wireless device.

17. The computer-readable storage medium of claim 13 further causing the wireless device to:
    host the primary smart contract on a memory of the wireless device; and
    link, over a telecommunications network, to the repository on a memory of a server located remote from the wireless device.

\* \* \* \* \*